United States Patent
Weissman et al.

[11] Patent Number: 5,947,080
[45] Date of Patent: Sep. 7, 1999

[54] NO TO NO$_2$ CONVERSION CONTROL IN A COMPRESSION INJECTION ENGINE BY HYDROCARBON INJECTION DURING THE EXPANSION STROKE

[75] Inventors: Walter Weissman, Berkeley Heights; Anthony Marion Dean, Hampton; Harry Stuard Pink, Whitehouse Station, all of N.J.

[73] Assignee: Exxon Research and Engineering Company, Florham Park, N.J.

[21] Appl. No.: 08/988,418

[22] Filed: Dec. 10, 1997

[51] Int. Cl.[6] .............................. F02D 41/34; F01N 3/20
[52] U.S. Cl. .......................... 123/300; 60/274; 123/304
[58] Field of Search .................................. 123/299, 300, 123/304; 60/274, 284, 285

[56] References Cited

U.S. PATENT DOCUMENTS

| | | | |
|---|---|---|---|
| 4,217,871 | 8/1980 | Ohashi et al. | 123/501 |
| 4,414,940 | 11/1983 | Loyd | 123/299 |
| 4,416,229 | 11/1983 | Wood | 123/304 |
| 4,452,040 | 6/1984 | Kobashi | 60/285 X |
| 4,481,921 | 11/1984 | Tsuhahara et al. | 123/304 |
| 4,543,930 | 10/1985 | Baker | 123/299 |
| 5,119,780 | 6/1992 | Ariga | 123/300 |
| 5,343,702 | 9/1994 | Miyajima et al. | 60/285 |
| 5,479,775 | 1/1996 | Kraemer et al. | 60/274 |
| 5,839,275 | 11/1998 | Hirota et al. | 6/285 |

FOREIGN PATENT DOCUMENTS 5-156993  6/1993  Japan ..................... 60/285

OTHER PUBLICATIONS

M. Dürnholz, et al., 6 Aachener Kolloquium Fahrzeng–und Motorentechnik '97, PP661–688.

Primary Examiner—Tony M. Argenbright
Attorney, Agent, or Firm—Gerard J. Hughes

[57] ABSTRACT

The invention is directed towards a method for adjusting the NO$_2$ to NO content of a diesel engine's exhaust without affecting engine performance. The NO$_2$ to NO ratio is adjusted by varying the amount and tinting of secondary hydrocarbon injection during the engine's expansion stroke. The appropriate amount of secondary injected hydrocarbon and the appropriate injection timing are determined from calibration values obtained by direct engine measurements and the desired NO$_2$:NO ratio.

7 Claims, 6 Drawing Sheets

Sec. Inj. Timing (Degrees After TDC)

NO TO NO₂ CONVERSION CONTROL IN A COMPRESSION INJECTION ENGINE BY HYDROCARBON INJECTION DURING THE EXPANSION STROKE

FIELD OF THE INVENTION

The present invention relates generally to an improved method for operating a diesel engine. More particularly, the method relates to a method for the conversion of NO into $NO_2$ by injecting hydrocarbon into a diesel engine's cylinder during decompression.

BACKGROUND OF THE INVENTION

In the normal operation of a diesel engine, atmospheric air is first compressed in the combustion chamber of the engine to a pressure of about 500 PSI. Compression of the air raises its temperature to about 1,000° F. Diesel fuel is then injected to the compressed hot air through a fuel injection nozzle. The fuel is atomized in the combustion chamber where it rises to its auto ignition temperature, resulting in the spontaneous ignition, burning, and expansion of the gases in the chamber. The expansion of the combustion products drives the cylinder downwardly thereby providing the power stroke of the engine.

In order for a diesel engine to operate efficiently, i.e., with minimum fuel consumption at maximum power, it is typically operated under air to fuel ratios which produce exhaust gases that contain large amounts of oxygen and usually only minimal amounts of unburned hydrocarbons. Unfortunately, operating a diesel engine for maximum power and efficiency also results in conditions that raise the peak operating temperatures and therefore results in the formation of compounds of nitrogen and oxygen known as $NO_x$ compounds.

One method for lowering the concentration of $NO_x$ compounds in exhaust gas emissions is, of course, to bring the exhaust gas into contact with a catalyst capable of reducing the amount of $NO_x$ species in the gas stream. However, for catalysts known to be effective in a diesel exhaust environment, catalytic $deNO_x$ is usually more effective when reducing species are present in the exhaust gas. In order to generate these species, the engine is operated at conditions of low peak temperature which are conditions that are directly opposed to what is desired from the stand point of overall efficient engine operation.

One way that the concentration of oxygenates, unsaturates, unsaturated oxygenates and mixtures thereof can be increased in the exhaust is by direct injection of a hydrocarbon into the diesel engine's cylinder during the engine's expansion (power) stroke. This is referred to as secondary injection. Many $deNO_x$ catalysts capable of using such hydrocarbon to reduce $NO_x$ species in the exhaust stream are more effective when the exhaust stream's $NO_2$:NO ratio can be controlled to provide an optimum ratio, depending on the particular catalyst employed.

Consequently, there is a need for controlling the $NO_2$:NO ratio among the $NO_x$ exhaust species in a diesel engine that employs secondary injection.

SUMMARY OF THE INVENTION

In one embodiment, the invention is a method for converting NO formed in a diesel fueled engine's cylinder during the engine's expansion stroke into $NO_2$ without substantially reducing the engine's power, the method comprising:

(a) determining at one or more preselected engine operating points a calibration amount of a hydrocarbon and a calibration crank angle value for injecting the hydrocarbon into the diesel-fueled engine's cyclinder during an expansion stroke following the injection of a primary fuel charge into the cylinder during a compression stroke whereby a desired $NO_2$ to NO ratio is obtained in the engine's exhaust stream;

and then during engine operation (b) measuring the engine's operating point;

(c) determining a crank angle value and a hydrocarbon amount for injection during the expansion stroke at the measured operating point from the calibration crank angle values and calibration hydrocarbon amounts at the preselected operating points when the measured operating point is the same as one of the predetermined operating points and, when the measured operating point is different from the predetermined operating points, determining the hydrocarbon amount and crank angle for injection during the expansion stroke by interpolating between the calibration crank angle values and the calibration hydrocarbon amounts at the predetermined operating points;

(d) injecting the amount of hydrocarbon into the engine's cylinder during the expansion stroke at the crank angle;

(e) repeating steps (c) and (d) whenever the operating point in step (b) changes.

DETAILED DESCRIPTION

The invention will now be described in greater detail with specific reference to a reciprocating four-stroke compression ignition internal combustion engine; however, it should be readily appreciated that the invention is equally applicable to other compression ignition engines such as two-stroke reciprocating compression internal combustion engines. Also, in the description which follows like reference numerals in the drawings apply to like parts.

Figure 1:
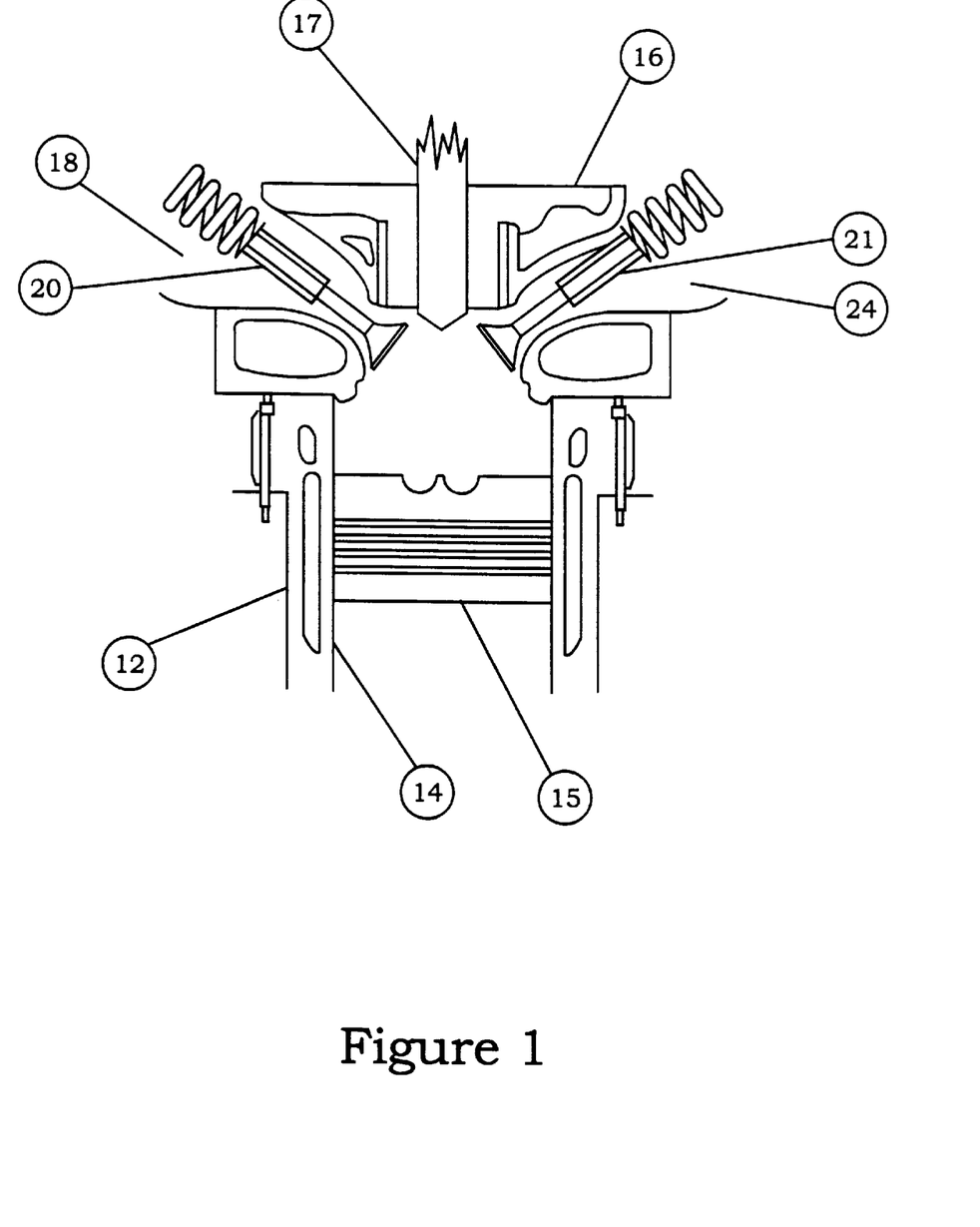
FIG. 1 is a schematic illustration of the principal components of one cylinder of a diesel engine necessary to understand the present invention.

Referring first to FIG. 1, a diesel engine includes an engine block 12 in which there is a combustion chamber or cylinder 14. Inside the cylinder 14 is a slideable piston 15 attached to the engine's crank (not shown). On top of cylinder 14 is a cylinder head 16 closing one end of the cylinder 14.

A fuel injection nozzle 17 is mounted in the cylinder head 16 for timed injection of diesel fuel directly into the combustion chamber or cylinder 14. The engine also includes an exhaust valve 21, exhaust port 24, an air valve 20 and air port 18.

In operation, when the piston 15 is at a position corresponding to a crank rotation angle of about 0° at the beginning of the cylinder's intake stroke, intake valve 20 opens and atmospheric air is drawn into the combustion chamber or cylinder 14 as the piston moves downwardly. Valve 20 closes at or soon after the conclusion of the intake stroke, and the piston 15 rises on the compression stroke. The piston 15 begins its compression stroke at a position near the bottom of the cylinder corresponding to a crank rotation angle of 180°, i.e., the bottom dead center position. An optional pilot fuel charge is injected into the combustion chamber when the piston 15 reaches a position corresponding to a crank rotation angle of about 330° on the compression stroke. The air in the cylinder is compressed increasing its temperature and pressure causing any pilot fuel charge to undergo a pre-flame chemical and physical reaction. As the compression continues, the primary diesel fuel is injected into the cylinder 14 via injection nozzle 17, and the diesel fuel will ignite causing the entire mixture in the combustion chamber 14 to expand. The expansion (or power) stroke of the engine begins as the piston passes a position corresponding to a top dead center (0°) crank angle. In accordance with the present invention during the expansion of the cylinder 14 on the power stroke a pre-selected amount of hydrocarbon fuel based on the amount of primary fuel is injected into the cylinder at a pre-determined rotation angle called the secondary injection angle. This pre-selected fuel injection may be injected via nozzle 17 or by a separate nozzle.

Hydrocarbon injection during expansion, i.e., the power stroke, is referred to as secondary injection in order to distinguish it from primary fuel injection. The hydrocarbon injected during expansion is the secondary injected hydrocarbon. Generally, the hydrocarbon fuel injected during the power stroke may be the same as the diesel fuel injected into the engine during the compression stroke or it may be some other hydrocarbon or oxygenate. The amount of fuel injected during secondary injection should range from about 0.5 to about 5 wt %, preferably about 1 wt % to 3 wt %, based on the weight of the primary fuel utilized for the main combustion. Desirably, secondary injection is made in a way that causes the injectant to mix thoroughly with the NO formed during combustion.

Figure 3:
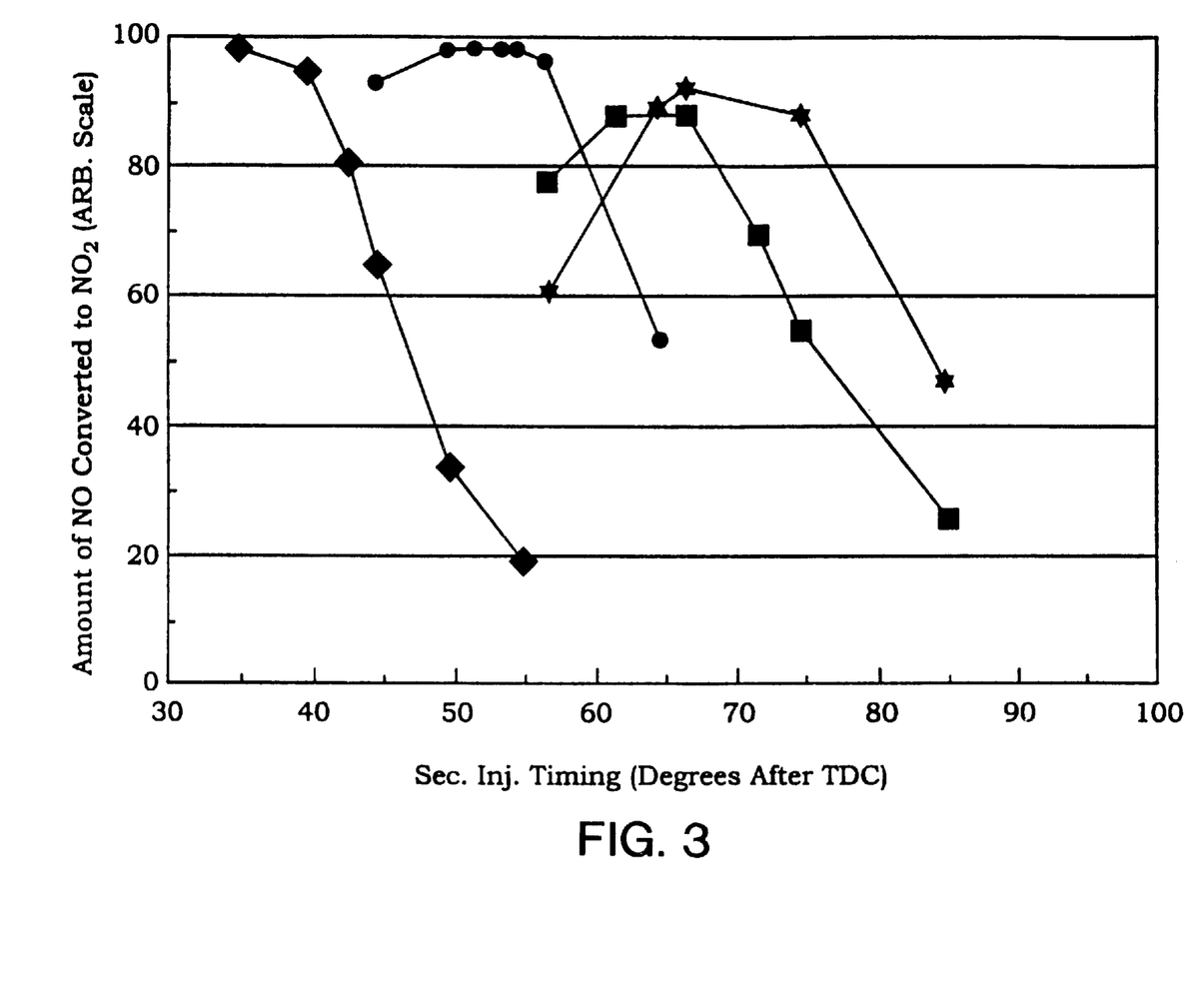
FIG. 3 shows the effect of engine operating parameters on the fraction of NO converted to $NO_2$ as a function of secondary injection angle as measured from the start of the expansion stroke in accordance with the present invention.

The secondary injection angle can be adjusted in order to provide for a range of NO to $NO_2$ conversion values as shown in FIG. 3. The figure illustrates the calculated NO to $NO_2$ conversion in a direct injected, 2.5 liter, 4 cylinder, turbocharged diesel engine having a compression ratio of 21:1 that is fueled with of a mixture of iso, normal, and cycloparaffin designed to represent the aliphatic portion of a typical diesel fuel (the aliphatic portion is the major portion of a typical diesel fuel). The figure shows that the secondary injection angle corresponding to peak conversion varies with engine load, speed, and inlet pressure. The data was generated using a kinetic model to simulate the performance of such an engine. Points represented by rectangles correspond to a Brake Mean Engine Pressure ("BMEP") load of 3.1 bars, 1.4 bars inlet pressure, and a rotational speed of 2250 rpm; diamond points correspond to 1.5 bars BMEP load, 1.4 bars inlet pressure, and 2100 rpm rotational speed; star points correspond to a 3.1 bars BMEP load, 1.2 bars inlet pressure, and 1550 rpm rotational speed; and circles correspond to 2.0 bars BMEP load, 1.1 bars inlet pressure, and 1550 rpm rotational speed. In the simulation depicted in FIG. 3, the amount of fuel injected during secondary injection is 2 wt % of the amount of primary fuel.

Figure 4:
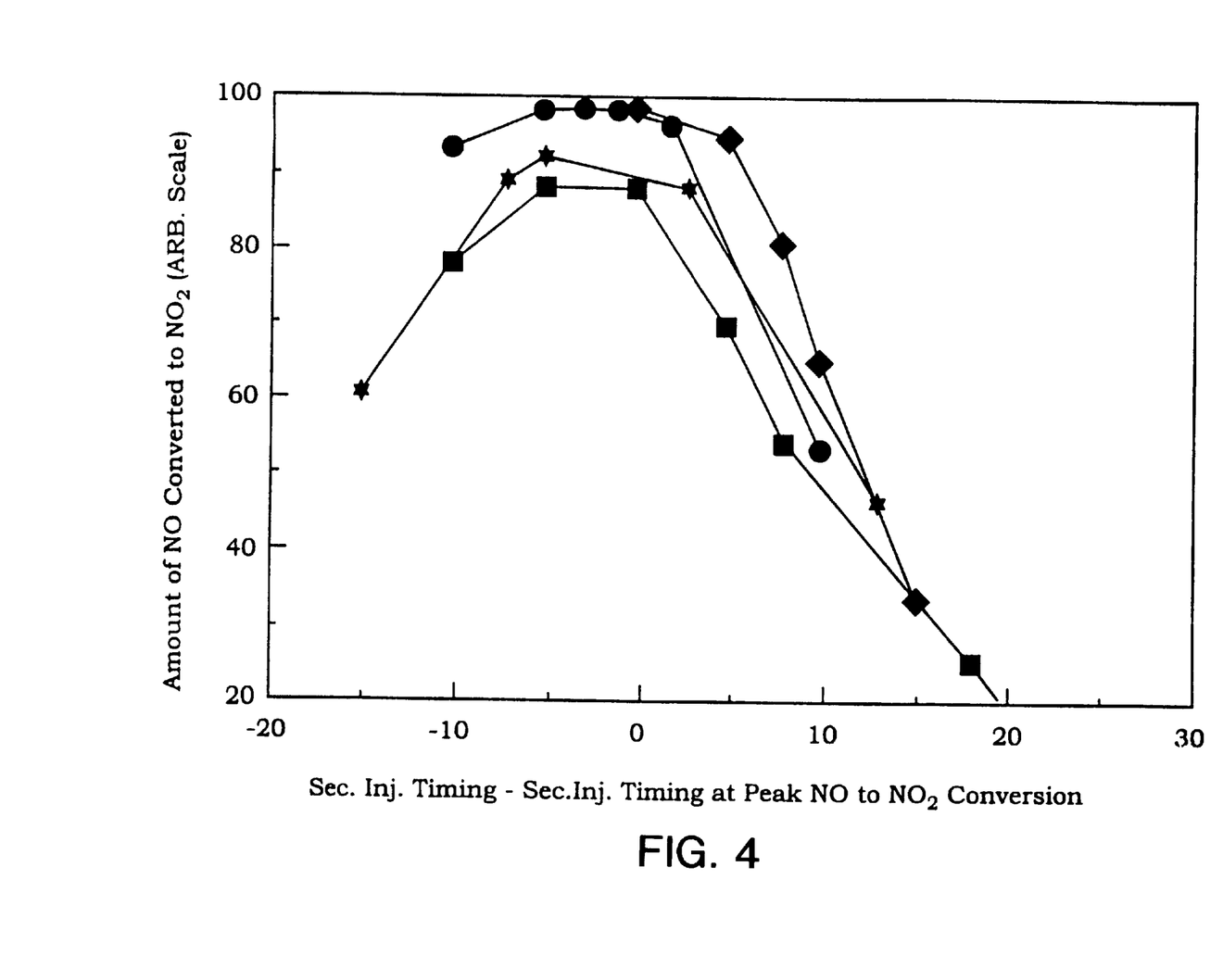
FIG. 4 is a graph showing that the fraction of NO converted to $NO_2$ as a function of the angular deviation from the angle corresponding to peak conversion is approximately independent of engine operating parameters.

In the present invention, secondary injection occurs at an angle that depends on the engine's load, inlet pressure when a compressor is present, and rotational speed. As explained above, secondary injection results in the conversion of NO to $NO_2$ during the expansion stroke, and consequently reduces the presence of NO in the exhaust stream. As explained above, NO to $NO_2$ conversion diminishes as secondary injection angle deviates from the angle corresponding to peak NO to $NO_2$ conversion. However, FIG. 4 shows that the extent of conversion reduction from the peak value is approximately independent of engine load, inlet pressure when a compressor is present, and speed as secondary injection angle deviates from the angle corresponding to peak conversion. The data of FIG. 4 was generated using the data from FIG. 3, and the rectangle, diamond, star, and circle representations correspond to the same operating parameter values as in FIG. 3.

It should be noted that in cases where a compressor is used, inlet pressure may be strongly correlated with engine rotational speed.

In one embodiment, a desired secondary injection angle is obtained by measuring NO to $NO_2$ conversion as a function of secondary injection angle as operating conditions such as air-fuel ratio, degree of exhaust gas recirculation, gas (air and EGR) inlet pressure when a compressor is present, engine load, and rotational speed are varied over the engine's entire operating range. These measurements are recorded as a calibration. It should be noted that all engine parameters need not be measured as part of the calibration with all engines because, as those skilled in the art are aware, some engine operating parameters may be strongly correlated depending on the configuration of the particular engine and its use. Generally, though, at least load and rotational speed must vary in determining the calibration.

During actual engine use, in accordance with this embodiment, the engine's operating conditions are measured, and the corresponding record of secondary injection angle is retrieved. The engine's injectors are then operated so that secondary injection occurs at the optimum angle through the action of an injector controller. The optimum angle, as set forth above, depends upon the conversion of NO to $NO_2$ that is desired at each operating point. In a preferred embodiment, the calibration is obtained as follows:

First, the secondary injection timing angle is determined at a reference point at which NO to $NO_2$ conversion is maximized. This timing angle is referred to as $AP_r$. Preferably, the reference point is selected to be well within the range of all parameters used in the calibration.

Once $AP_r$ is determined, diesel engine measurements are made to determine the extent of the changes in injection angle necessary to maximize NO to $NO_2$ conversion as engine parameters such as load, speed, and gas inlet pressure when a compressor is present, are varied. The injection angle corresponding to maximum conversion is recorded for operating conditions corresponding to the operating range of the engine. The injection angle corresponding to peak reductant production (AP) at an engine operating point (i) that is different from the reference point (r) is referred to as $AP_i$. The deviation in injection angle from the reference injection angle is, therefore, $AP_i - AP_r$.

Those skilled in the art of diesel engine exhaust catalyst operation are aware that it can be advantageous for a portion of the $NO_x$ in the exhaust stream to be in the form of NO. In this situation, it may be desirable to diminish NO to $NO_2$ conversion from peak conversion to some desired conversion value. The desired secondary injection angle at the reference operating point (r) corresponding to the desired conversion value, $AD_r$, is determined by direct engine measurements. It has been discovered that the desired deviation from the injection angle corresponding to peak conversion at any engine operating point (i) equal to $AD_i-AP_i$ is a constant approximately equal to the value $AD_r-AP_r$. See FIG. 4. In other words, it has been discovered that the amount of deviation in crank angle between the secondary injection angle corresponding to peak reductant generation at any operating point (i) and the angle corresponding to the desired oxygenate/olefin ratio and total cracked product yield at the same point (i) is approximately constant for all values of (i), and consequently can be evaluated at the reference value (r).

To summarize, in this embodiment the parameters $AP_r$ and $AD_r-AP_r$ and vector $AP_i$ are determined as a calibration using direct engine measurements. The amount of NO to $NO_2$ conversion can be optimized later during actual engine use by determining the engine's operating point (i) that corresponds to a particular operating condition and then determining the desired crank angle for secondary injection $AD_i$ from the relationship $AD_i=AP_r+(AP_i-AP_r)+(AD_i-AP_i)$, where $AD_i-AP_i$ is equal to $AD_r-AP_r$ for any (i).

Calibration points are selected from among those values of engine load and speed that correspond to the engine's desired operating range. The particular points selected will depend on the particular catalyst employed and the desired $NO_2$ to NO ratio present in the exhaust stream before the exhaust catalyst as a function of engine load and speed.

Catalytic conversion of $NO_x$ species occurs in a temperature range where the exhaust catalyst is functional. Exhaust catalyst temperature at any particular speed is principally determined by the operating load. Consequently, at any particular speed in the operating range, the minimum load-speed calibration point is selected at a load corresponding to an exhaust catalyst temperature at the beginning of the functional range. The maximum load-speed calibration point at that speed is selected at a load corresponding to an exhaust catalyst temperature at the upper end of the catalyst's functional temperature range, provided the load does not exceed the engine's maximum load for the selected speed.

In practice during calibration of a diesel engine, calibration points are selected at speeds spanning the desired operating range, and maximum and minimum load value are determined for each speed as set forth above. Within the range of these maximum and minimum load values, other calibration points will be selected where increased $NO_x$ production is observed.

The exact number of calibration points will depend on both the type of diesel engine and the manner in which that engine is used. For example, in cases where an engine is operated continuously at a constant load and speed, a single calibration point may be sufficient in the practice of the invention. In other cases, such as those in which an engine is subjected to rapidly varying load and speed conditions over the entire engine operating range, calibration points may include minimum and maximum load values at representative speeds as well as calibration points within these minimum and maximum values at load-speed points corresponding to increased $NO_x$ production. The Elementary Urban Driving Cycle+Extra-Urban Driving Cycle (E.C.E. R15-E.U.D.C.) cycle is representative of such a case. This driving cycle is set forth in directive 91/441/E.E.C. as amended by 96/69/E.C. as the Type 1 Test, emission test cycle.

It is not necessary to obtain a calibration value at every operating point in the engine operating range that exhibits $NO_x$ production.

A sufficient number of calibration points have been obtained when standard interpolation methods known to those skilled in the art can be used to determine the crank angle for secondary injection corresponding to peak reductant generation at any engine operating point.

Figure 2:
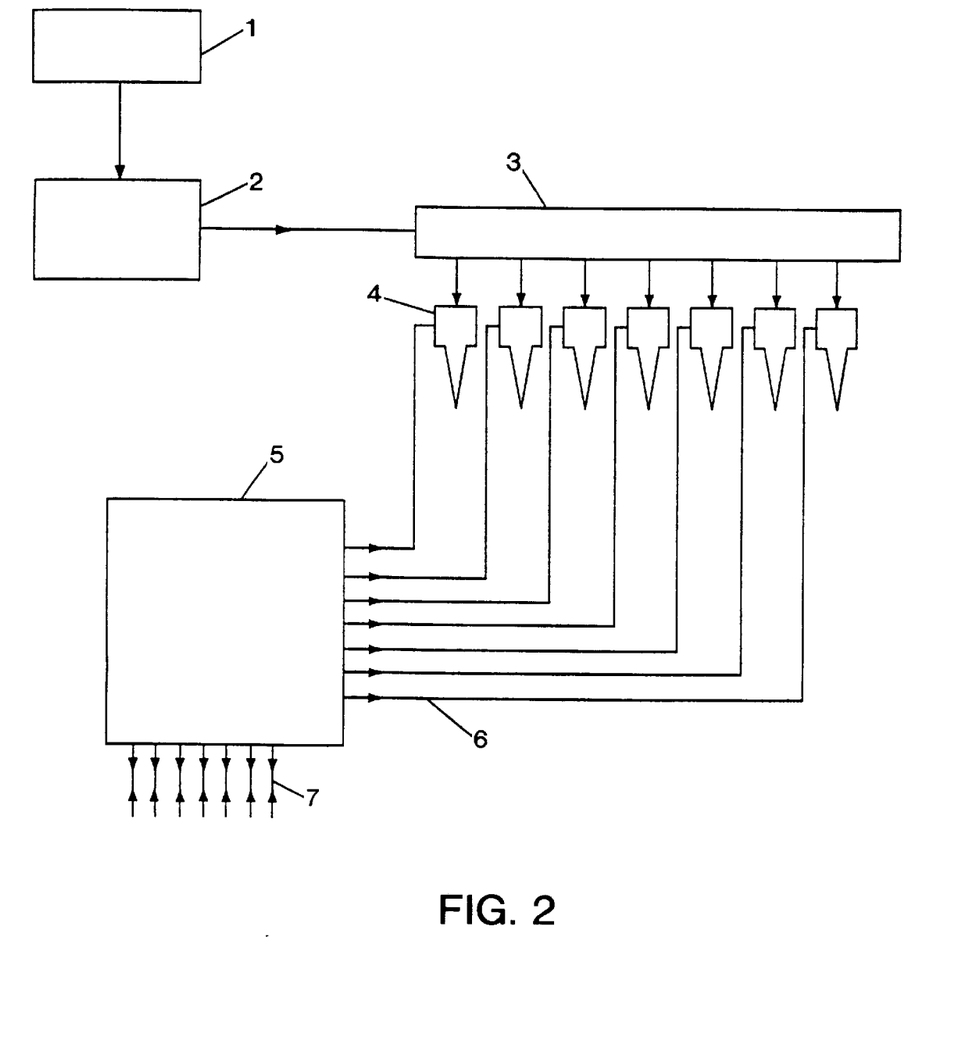
FIG. 2 is a schematic illustration a common rail injection system configured for use with the present invention.

In the preferred embodiment, the invention is implemented as shown in FIG. 2. FIG. 2 shows a fuel reservoir (1) connected to a fuel pump (2). Fuel leaves the fuel pump at a high pressure and is delivered to a common rail (3). An injector control unit (5) senses engine load and speed information via sensors (7). The injector control unit determines the engine operating point (i), and calculates the desired injection of angle $AD_i$. The injector control unit produces a signal (6) that activates the engine's injectors (4) at the appropriate crank angle so that secondary injection occurs at the desired crank angle $AD_i$ in each of the engine's cylinders.

As should be readily appreciated, diesel engines come in various models. For each model engine, the relation between the condition of fuel consumption and the characteristics of the exhaust gas can be easily determined. From these, any person skilled in the art is capable of adjusting the exhaust gas composition by injecting preselected amount of hydrocarbon into the cylinder during its expansion or power stroke at a predetermined time. This permits the engine to be optimized from the viewpoint of providing maximum power and efficiency and at the same time being able to have an exhaust gas which has an appropriate $NO_2$ to NO ratio present at the catalytic converter. Those skilled in the art are aware that many catalytic converters in use decompose $NO_x$ exhaust species more efficiently in the presence of an optimum $NO_2$ to NO ratio amount the $NO_x$ exhaust species. When these catalytic converters are present, secondary hydrocarbon injection timing and amount should be adjusted for the appropriate ratio. It should be noted that NO and $NO_2$ account for substantially all of the $NO_x$ compounds produced in the engine. It should also be noted that NO to $NO_2$ conversion is also affected by the extent of mixing the NO formed during primary fuel combustion with the secondary injected fuel. The more intimate the mixing between the NO and the secondary injected fuel, the greater the NO to $NO_2$ conversion. Peak NO to $NO_2$ conversion resulting from secondary injection at a given crank angle and under given engine operating conditions will occur when the NO and the secondary injectant are completely intermixed.

Figure 5:
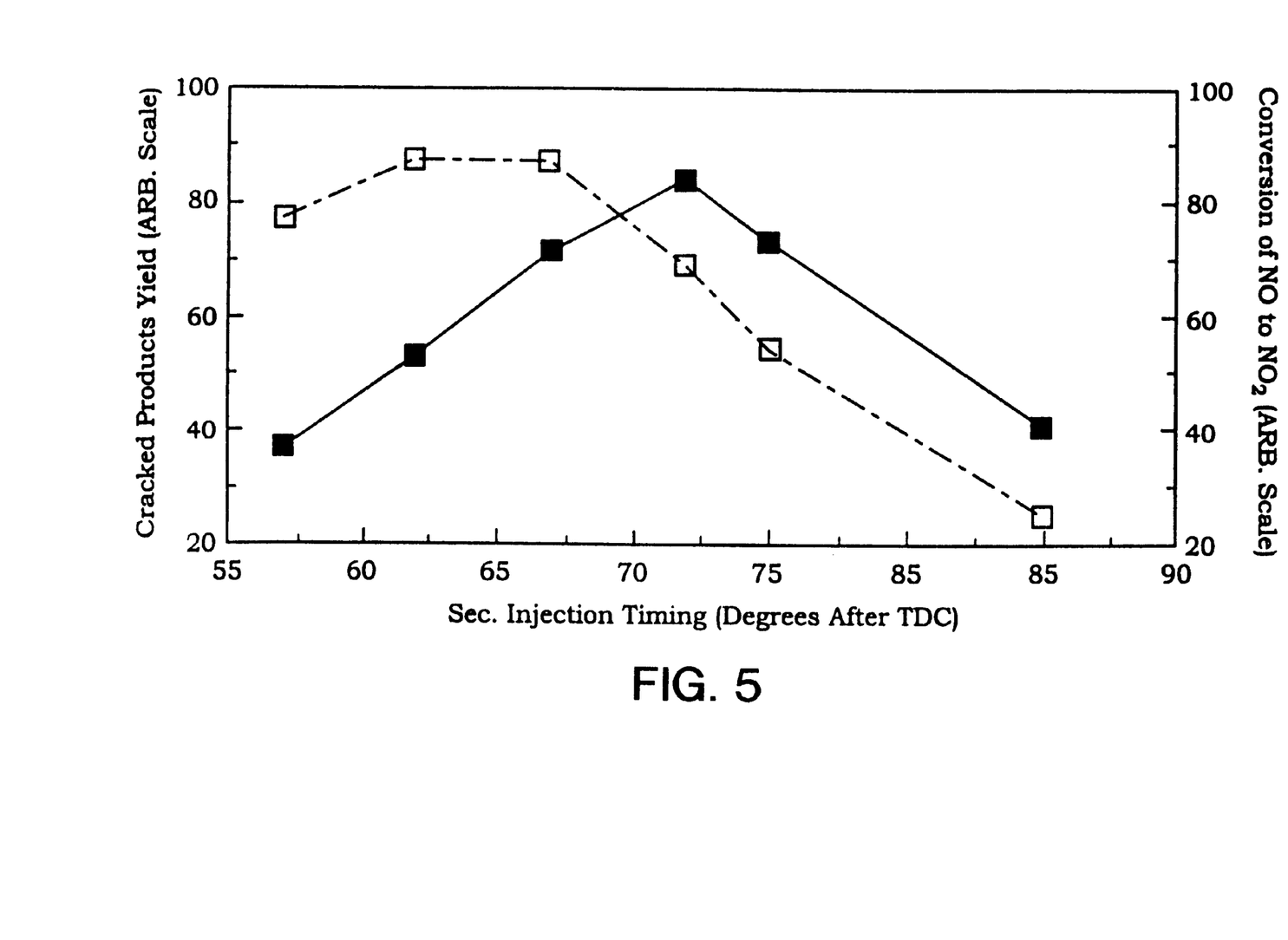
FIG. 5 illustrates the production of cracked products formed from a secondary injectant and NO to $NO_2$ conversion as a function of a timing angle. Solid rectangles correspond to cracked product yield, open rectangles correspond to NO conversion.

Secondary injection results in the formation of cracked products comprising oxygenates, unsaturates, and oxygenated unsaturates. Those skilled in the art are aware that these compounds can function as reductants of $NO_x$ compounds. FIG. 5 shows that at some engine operating points it is possible to select a secondary injection angle that corresponds to both high reductant formation and high NO to $NO_2$ conversion.

Figure 6:
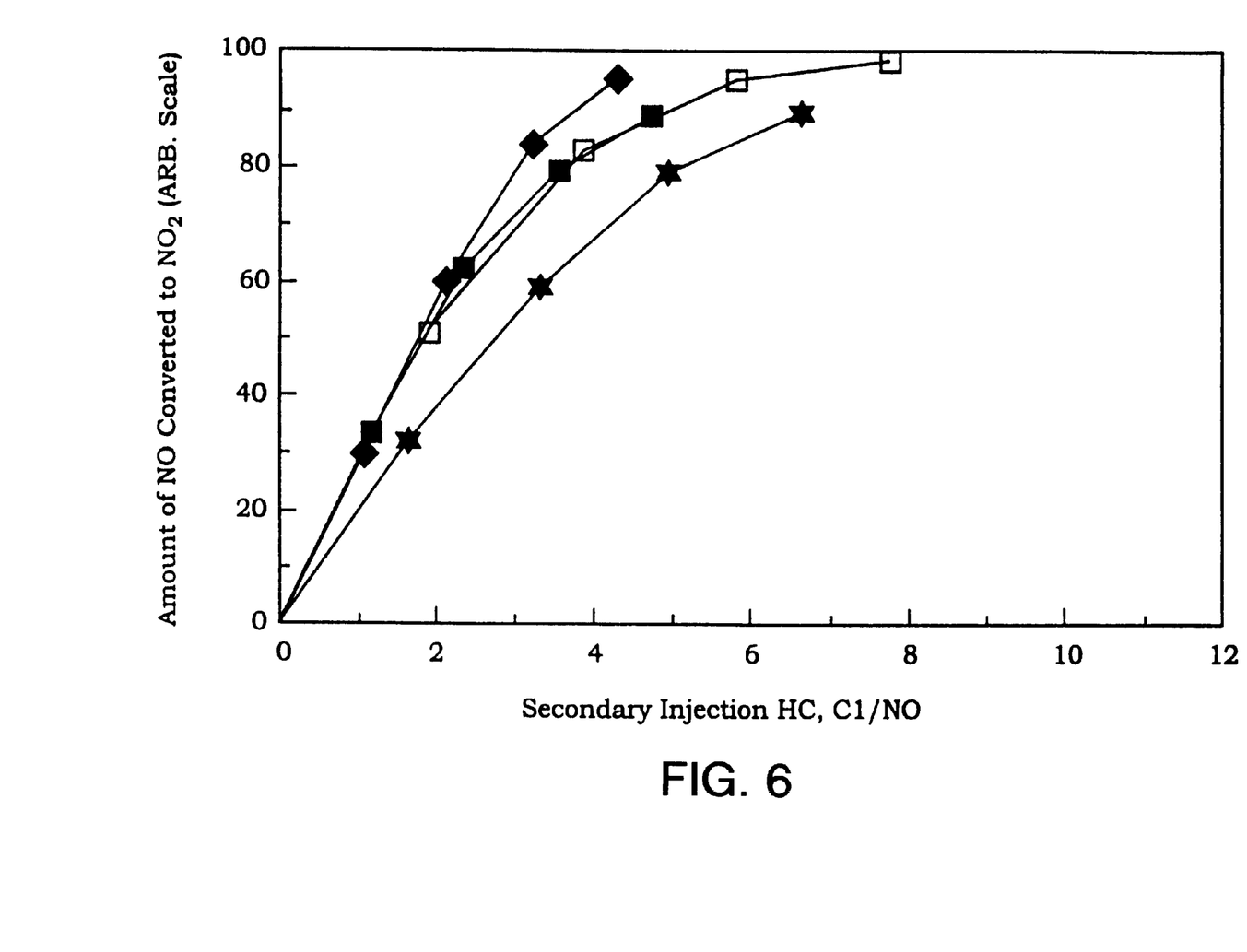
FIG. 6 shows the NO to $NO_2$ conversion dependence on the quantity of secondary injected hydrocarbon.

The amount of secondary hydrocarbon injected will depend in part on the amount of hydrocarbon needed in the exhaust as $NO_x$ reductant. This amount will generally range from about 0.5 wt % to about 5 wt % of the primary fuel injected. The amount of secondary injectant also depends on the desired NO to $NO_2$ ratio. FIG. 6 illustrates the relationship between NO to $NO_2$ conversion as a function of the molar hydrocarbon to NO ratio. The figure shows that if, for example, 75% NO to $NO_2$ conversion is desired over the engine operating range, then the minimum molar ratio of hydrocarbon to NO would be 5:1. A 5:1 molar ratio corresponds to an amount of secondary injectant of about 1.5 wt % based on the weight of the primary fuel charge.

In FIG. 6, the rectangle, diamond, and star points correspond to the same engine parameters as in FIGS. 3 and 4. However, points corresponding to a 2.0 bars BMEP load, 1.1 bars inlet pressure, and 1550 rpm rotation speed are represented by unshaded rectangles and not circle as in FIGS. 3 and 4. The molar ratio is that of the $C_1$ component of the fuel to the NO in the exhaust stream.

What is claimed is:

1. A method for varying the relative concentration of $NO_2$ to NO compounds formed in a diesel fueled engine's cylinder without substantially reducing the engine's power, the method comprising:

(a) determining at one or more preselected engine operating points a calibration amount of a hydrocarbon and a calibration crank angle value for injecting the hydrocarbon into the diesel-fueled engine's cylinder during an expansion stroke following the injection of a primary fuel charge into the engine's cylinder during a compression stroke whereby a desired $NO_2$ to NO ratio is obtained in the engine's exhaust stream;

and then during engine operation (b) measuring the engine's operating point;

(c) determining a crank angle value and a hydrocarbon amount for injection during the expansion stroke following injection of the primary fuel charge during the compression stroke at the measured operating point from the calibration crank angle values and calibration hydrocarbon amounts at the preselected operating points when the measured operating point is the same as one of the predetermined operating points and, when the measured operating point is different from the predetermined operating points, determining the hydrocarbon amount and crank angle for injection during the expansion stroke by interpolating between the calibration crank angle values and the calibration hydrocarbon amounts at the predetermined operating points;

(d) injecting the amount of hydrocarbon into the engine's cylinder during the expansion stroke at the crank angle;

(e) repeating steps (c) and (d) whenever the operating point in step (b) changes.

2. The method of claim 1 wherein the engine's operating point is determined from at least one of engine load, engine speed, and inlet gas pressure when an inlet gas compressor is present.

3. The method of claim 1 wherein the crank angle at injection ranges from about 20° after top dead center to about 180° after top dead center.

4. The method of claim 3 wherein the amount of hydrocarbon injected during the expansion stroke ranges from about 0.5 wt. % to about 5 wt. % based on the weight of the engine's primary fuel charge.

5. The method of claim 4 wherein the injected hydrocarbon is the same as the primary fuel.

6. The method of claim 4 wherein the injected hydrocarbon is different from the primary fuel, and wherein the hydrocarbon is selected from the group consisting of iso, cyclo, and normal paraffins, and mixtures thereof.

7. A method for varying the relative concentrating $NO_2$ to NO compounds in a diesel-fueled engine's cylinder without substantially reducing the engine's power, the method comprising:

(a) determining at one or more preselected engine operating points a calibration amount of a hydrocarbon for injection into the cylinder during an expansion stroke following the injection of a primary fuel charge into the cylinder during an compression stroke, the amount ranging from about 0.5 wt. % to about 5 wt. % based on the weight of the engine's primary fuel charge and the hydrocarbon being the same as the primary fuel and a calibration crank angle value ranging from about 20° after top dead center to about 180° after top dead center whereby a desired $NO_2$ to NO ratio is obtained in the engine's exhaust stream; and then during engine operation, (b) measuring the engine's operating point;

(c) determining a crank angle value and a hydrocarbon amount for injection during the expansion stroke at the measured operating point from the calibration crank angle values and calibration hydrocarbon amounts at the preselected operating points when the measured operating point is the same as one of the predetermined operating points and, when the measured operating point is different from the predetermined operating points, determining the hydrocarbon amount and crank angle for injection during the expansion stroke by interpolating between the calibration crank angle values and the calibration hydrocarbon amounts at the predetermined operating points;

(d) injecting the amount of hydrocarbon into the engine's cylinder during the expansion stroke at the crank angle;

(e) repeating steps (c) and (d) whenever the operating point in step (b) changes.

* * * * *